(12) United States Patent
Hodgson et al.

(10) Patent No.: US 10,518,470 B1
(45) Date of Patent: Dec. 31, 2019

(54) SEALED TYPE LIGHT CURING 3D PRINTER

(71) Applicants: XYZPRINTING, INC., New Taipei (TW); KINPO ELECTRONICS, INC., New Taipei (TW)

(72) Inventors: Matthew Hodgson, Irvine, CA (US); Tsung-Hua Kuo, New Taipei (TW)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 70 days.

(21) Appl. No.: 16/027,576

(22) Filed: Jul. 5, 2018

(51) Int. Cl.
| | | |
|---|---|---|
| *B29C 64/255* | (2017.01) | |
| *B29C 64/135* | (2017.01) | |
| *B33Y 50/02* | (2015.01) | |
| *B33Y 30/00* | (2015.01) | |
| *B29C 64/393* | (2017.01) | |
| *B29C 64/124* | (2017.01) | |
| *B29C 64/129* | (2017.01) | |
| *B29C 64/20* | (2017.01) | |
| *B29C 64/371* | (2017.01) | |
| *B29C 64/245* | (2017.01) | |

(52) U.S. Cl.
CPC .......... *B29C 64/255* (2017.08); *B29C 64/124* (2017.08); *B29C 64/129* (2017.08); *B29C 64/135* (2017.08); *B29C 64/20* (2017.08); *B29C 64/245* (2017.08); *B29C 64/371* (2017.08); *B29C 64/393* (2017.08); *B33Y 30/00* (2014.12); *B33Y 50/02* (2014.12)

(58) Field of Classification Search
CPC ... B29C 64/245; B29C 64/371; B29C 64/124; B29C 64/129; B29C 64/135; B29C 64/20; B29C 64/255
USPC .......................................................... 264/401
See application file for complete search history.

(56) References Cited

U.S. PATENT DOCUMENTS

| | | | | |
|---|---|---|---|---|
| 2001/0015238 | A1* | 8/2001 | Gaylo ................. | B22F 3/004 141/12 |
| 2011/0265893 | A1* | 11/2011 | Scott ................... | B29C 64/20 29/426.2 |
| 2015/0306666 | A1* | 10/2015 | Honda ................. | B22F 3/1055 425/78 |
| 2017/0239885 | A1* | 8/2017 | Knecht ................ | B29C 64/135 |
| 2018/0001553 | A1* | 1/2018 | Buller ................. | B33Y 50/02 |
| 2018/0361670 | A1* | 12/2018 | Kobayashi .......... | B29C 64/393 |
| 2019/0009338 | A1* | 1/2019 | McMurtry ........... | B22F 3/1055 |

* cited by examiner

*Primary Examiner* — Timothy Kennedy
(74) *Attorney, Agent, or Firm* — Chun-Ming Shih; HDLS IPR SERVICES

(57) ABSTRACT

A sealed type light curing 3D printer and a method using the same are provided. The 3D printer includes a reservoir; a microcontroller; a plunger for creating a sealed space between itself and a bottom of the reservoir by disposing in the reservoir; a printing platform releasably disposed on a bottom of the plunger wherein a bottom of the printing platform is flush with the bottom of the plunger; an illumination unit under the reservoir; a liquid material tank communicating with the reservoir; and a gas tank communicating with the reservoir. Both the plunger and the printing platform lift a first distance to draw liquid material into the reservoir. The plunger further lifts a second distance to draw gas into the reservoir.

12 Claims, 13 Drawing Sheets

SEALED TYPE LIGHT CURING 3D PRINTER

BACKGROUND OF THE INVENTION

1. Technical Field

The technical field relates to three-dimensional (3D) printing, and more particularly relates to a sealed type light curing 3D printer.

2. Description of Related Art 3D printers are widely used in recent years due to advancements of technologies, compactness of the 3D printer, and greatly decreased price in which digital light processing (DLP) 3D printers and stereolithography (SLA) 3D printers are popular among the vase consumers due to compactness and quality.

Referring to FIG. 1, a conventional DLP 3D printer (called 3D printer hereinafter) 1 includes a tank 11 for storing liquid material 2, a printing platform 12 disposed above a bottom of the tank 11, and an illumination unit 13 disposed under the tank 11.

In a printing process, a microcontroller (not shown) of the 3D printer 1 activates and lowers the printing platform 12 to immerse same in the liquid material 2 until the printing platform 12 is dispose above the bottom of the tank 11 in which a distance between the printing platform 12 and the bottom of the tank 11 is about a thickness of a cured layer. Next, the microcontroller activates the illumination unit 13 to emit light toward the liquid material 2 contained in a tank 11 based on the pattern of the cured layer. The lit portions of the liquid material 2 cure and create a slicing object 21 having the corresponding pattern on an underside of the printing platform 12. The 3D printer 1 repeatedly performs above steps to create a 3D model by adding a plurality of the created slicing objects 21 together.

As shown in FIG. 1, after being cured, the slicing object 21 is attached to both the underside of the printing platform 12 and the bottom of the tank 11. The microcontroller is required to perform steps to separate the slicing object 21 from the bottom of the tank 11 prior to lifting both the printing platform 12 and the attached slicing object 21. Such separation of the slicing object 21 is required for each created slicing object 21. Disadvantageously, it greatly increases the total printing time.

Further, quality of the liquid material 2 filled in the tank of the SLA or DLP 3D printer may be degraded due to oxidization. And in turn, it may cause difficulties in printing. Furthermore, some kinds of liquid material having good curing effects may be smelled and thus users dislike using these kinds of liquid material. Thus, the need for improvement still exists.

SUMMARY OF THE INVENTION

The disclosure is directed to a sealed type light curing 3D printer. Curing of a slicing object of a plurality of cured layers of a 3D object is made possible by separating liquid material from a bottom of a reservoir by gas. After the slicing object has been cured, additional layer separation steps are not performed. The purpose of continuously curing a slicing object of a plurality of cured layers of a 3D object is achieved.

It is therefore an object of the invention to provide a sealed type light curing 3D printer comprising a reservoir; a microcontroller; a plunger electrically connected to the microcontroller and configured to create a sealed space between itself and a bottom of the reservoir by disposing in the reservoir; a printing platform electrically connected to the microcontroller and releasably disposed on a bottom of the plunger wherein a bottom of the printing platform is flush with the bottom of the plunger; an illumination unit electrically connected to the microcontroller and disposed under the reservoir; a liquid material tank for storing liquid material and configured to communicate with the reservoir; and a gas tank for storing gas and configured to communicate with the reservoir; wherein the microcontroller lifts both the plunger and the printing platform from the bottom of the reservoir a first distance along Z-axis, thereby drawing the liquid material into the reservoir; wherein the microcontroller further lifts the plunger a second distance along Z-axis, thereby drawing the gas into the reservoir; wherein the gas concentrates on a lower portion of the reservoir and the liquid material is floated on top of the gas; wherein a distance between the bottom of the printing platform and a bottom of the liquid material in the reservoir is equal to a thickness of a cured layer to be created; and wherein in a printing process, the microcontroller activates the illumination unit to emit light toward the bottom of the printing platform based on a plurality of records of slicing information of a 3D object to be created, and further lifts the printing platform a distance along Z-axis, the distance being equal to the thickness of the cured layer, thereby continuously curing a slicing object of a plurality of the cured layers of the 3D object.

It is another object of the invention to provide a sealed type light curing 3D printer comprising a reservoir; a microcontroller; a plunger electrically connected to the microcontroller and configured to create a sealed space between itself and a top of the reservoir by disposing in the reservoir; a printing platform electrically connected to the microcontroller and releasably disposed on a top of the plunger wherein a top of the printing platform is flush with the top of the plunger; an illumination unit electrically connected to the microcontroller and disposed above the reservoir; a liquid material tank for storing liquid material and configured to communicate with the reservoir; and a gas tank for storing gas and configured to communicate with the reservoir; wherein the microcontroller lowers both the plunger and the printing platform from the top of the reservoir a first distance along Z-axis, thereby drawing the liquid material into the reservoir; wherein the microcontroller further lowers the plunger a second distance along Z-axis, thereby drawing the gas into the reservoir; wherein the gas concentrates on an upper portion of the reservoir and the liquid material is 3Deposited below the gas; wherein a distance between the top of the printing platform and a top of the liquid material in the reservoir is equal to a thickness of a cured layer to be created; and wherein in a printing process, the microcontroller activates the illumination unit to emit light toward the top of the printing platform based on a plurality of records of slicing information of a 3D object to be created, and further lowers the printing platform a distance along Z-axis, the distance being equal to the thickness of the cured layer, thereby continuously curing a slicing object of a plurality of the cured layers of the 3D object.

The invention has the following characteristics: The liquid material and the bottom of the reservoir are separated by the gas. The illumination unit emits light toward the liquid material to create a slicing object of one of a plurality of cured layers of a 3D object. After the slicing object has been cured, no additional layer separation steps are performed prior to curing a next slicing object. In comparison with the conventional art, the invention can achieve continuous curing, thereby greatly increasing the printing speed.

Further, for separating the liquid material from the bottom of the reservoir the invention creates a sealed space in the reservoir by lifting or lowering the plunger in the reservoir. By utilizing the sealed type light curing 3D printer of the invention, material subject to oxidation can be chosen as the liquid material. Also, smell of the liquid material in the reservoir does not propagate in the air. Thus, users do not need to bear the smell of the liquid material.

The above and other objects, features and advantages of the invention will become apparent from the following detailed description taken with the accompanying drawings.

DETAILED DESCRIPTION OF THE INVENTION

Embodiments of the invention will now be described, by way of example only, with reference to the accompanying drawings.

Figure 1:
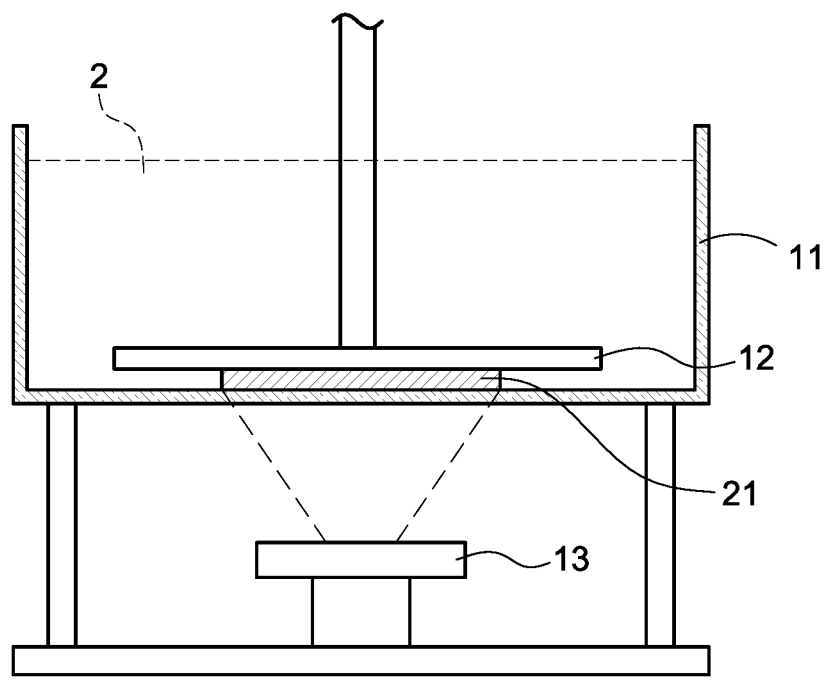
FIG. 1 is a side elevation in part section of a conventional 3D printer.
Figure 2:
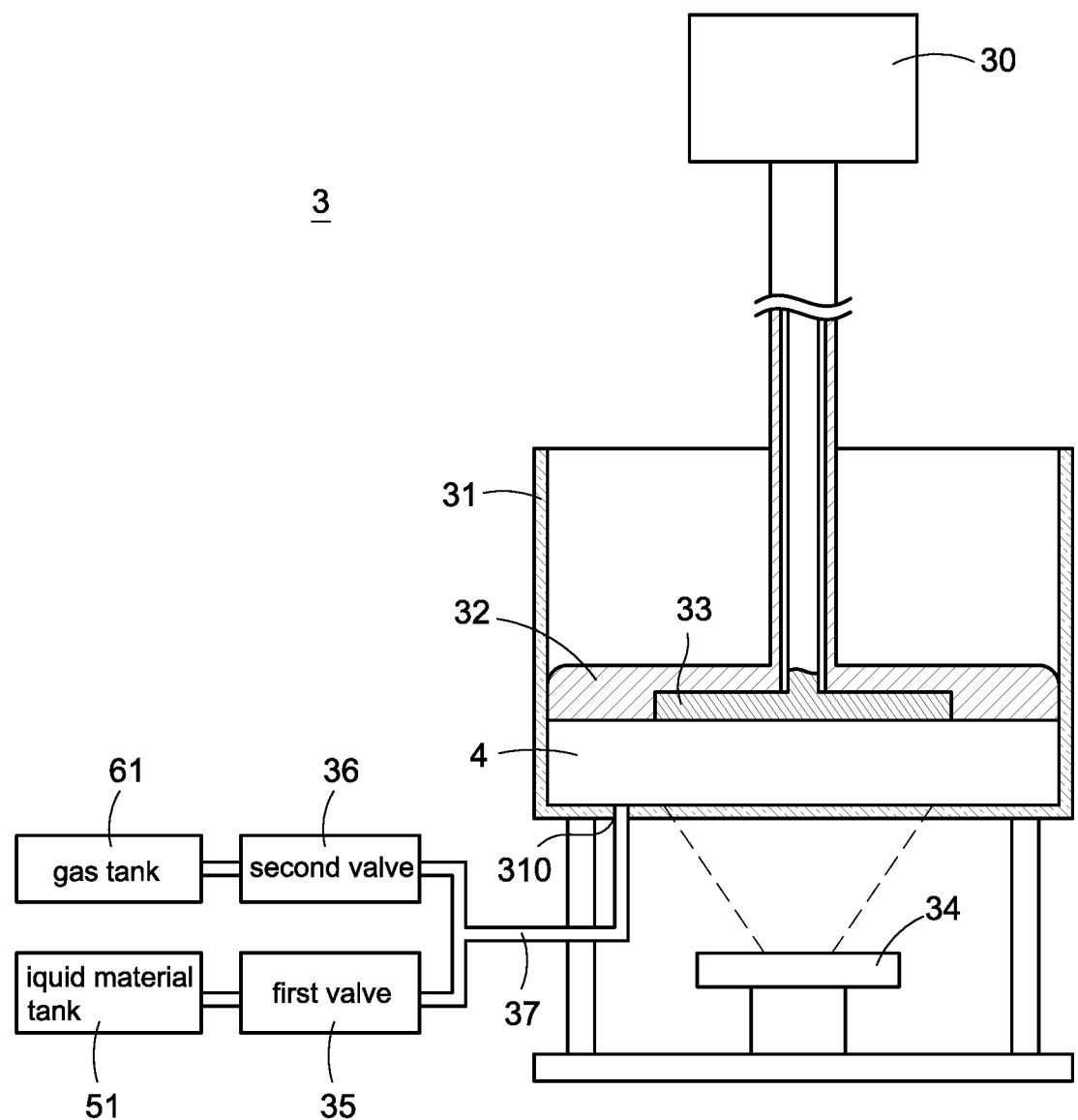
FIG. 2 is a side elevation in part section of a 3D printer according to a first preferred embodiment of the invention.

Referring to FIG. 2, it is a side elevation in part section of a 3D printer 3 according to a first preferred embodiment of the invention. The 3D printer 3 is a sealed type light curing 3D printer (called 3D printer 3 hereinafter). Specifically, the 3D printer 3 is implemented as a digital light processing (DLP) 3D printer or a stereolithography (STL) 3D printer.

For the purpose of description, the 3D printer 3 is a DLP 3D printer in FIG. 2 but the invention is not limited to such.

As shown in FIG. 2, the 3D printer 3 comprises a reservoir 31, a plunger 32, a printing platform 33, an illumination unit 34, a liquid material tank 51 for storing liquid material, and a gas tank 61 for storing gas.

Figure 3:
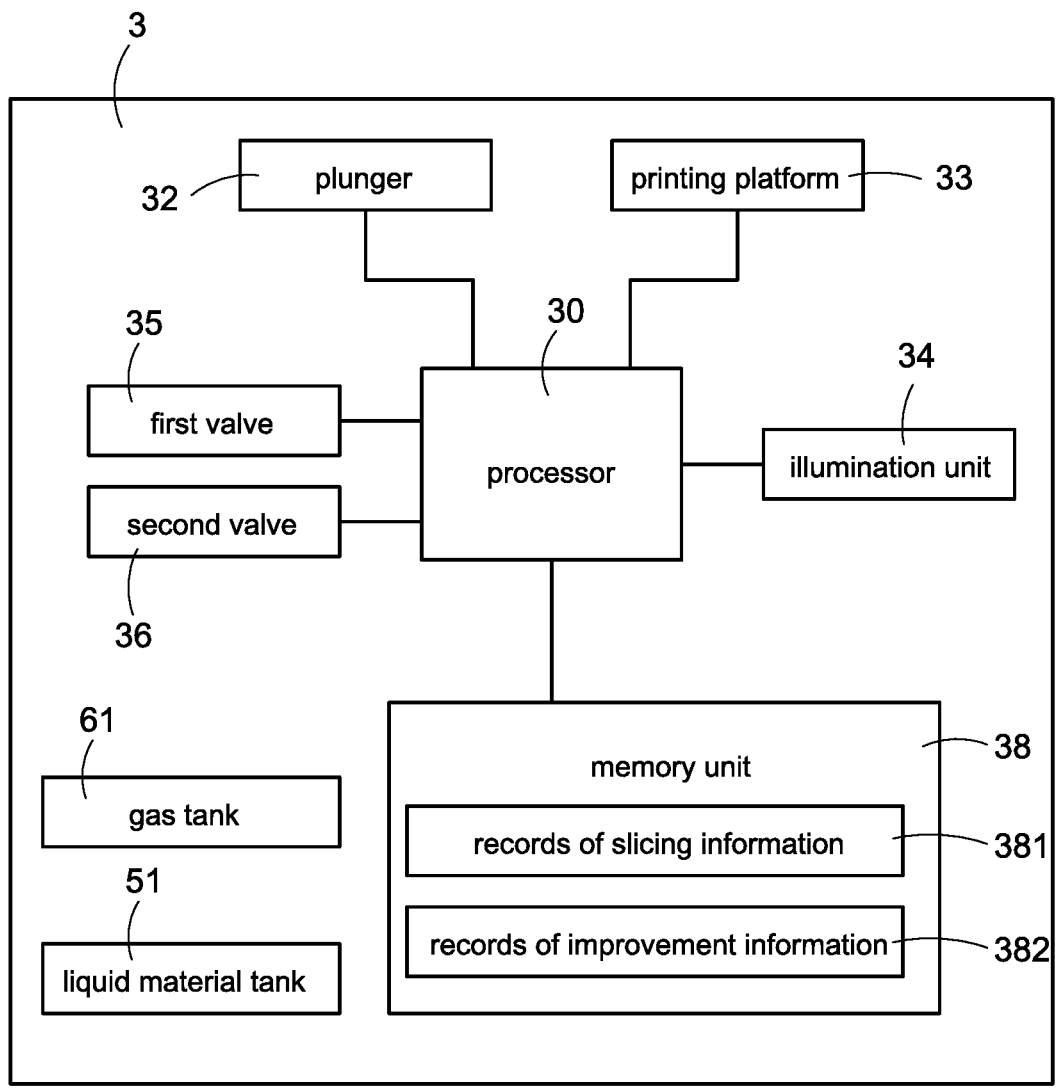
FIG. 3 is a block diagram of the 3D printer of FIG. 2.

Referring to FIG. 3 in conjunction with FIG. 2 in which FIG. 3 is a block diagram of the 3D printer 3. As shown in FIG. 3, the 3D printer 3 further comprises a microcontroller 30 electrically connected to the plunger 32, the printing platform 33 and the illumination unit 34.

The reservoir 31 has a U-shaped longitudinal section. The plunger 32 is slidably disposed in the reservoir 31. A sealed space 4 is formed between the plunger 32 and the reservoir 31. The printing platform 33 is disposed in an underside of the plunger 32 and is flush with the underside of the plunger 32. Specifically, the plunger 32 has a storage vessel (not shown) with the printing platform 33 disposed therein. The microcontroller 30 may activate both the plunger 32 and the printing platform 33 to move toward the bottom of the reservoir 31. At the end of the downward movement, both undersides of the plunger 32 and the printing platform 33 contact the bottom of the reservoir 31.

It is noted that if the sealed space 4 exists because the plunger 32 is slidably disposed in the reservoir 31, the microcontroller 30 may communicate the reservoir 31 with the atmosphere while moving both the plunger 32 and the printing platform 33, thereby facilitating the movement. It is preferred that a valve (not shown) is provided on the reservoir 31 and opening or closing of the valve can be controlled by the microcontroller 30.

The illumination unit 34 is disposed under the reservoir 31 and is adapted to emit light toward inside of the reservoir 31.

Prior to printing, the microcontroller 30 of the 3D printer 3 activates and moves both the plunger 32 and the printing platform 33 downward until being stopped by the bottom of the reservoir 31. As an end, the sealed space 4 does not exist. Next, the microcontroller 30 lifts both the plunger 32 and the printing platform 33 from the bottom of the reservoir 31 a first distance along Z-axis of the 3D printer 3. The liquid material in the liquid material tank 51 is drawn into the reservoir 31 due to pressure of the formed sealed space 4 between both the plunger 32 and the printing platform 33 and the bottom of the reservoir 31.

After the reservoir 31 has been filled with the liquid material, the microcontroller 30 further lifts the plunger 32 a second distance. As a result, the plunger 32 is separated from the printing platform 33. As a result, the gas in the gas tank 61 is drawn into the reservoir 31 due to pressure of the formed sealed space 4 between the plunger 32 and the bottom of the reservoir 31.

One aspect of the invention is detailed below. Specific gravity of the gas is greater than that of the liquid material. The gas concentrates on a lower portion of the reservoir 31 and the liquid material is floated on the top of the gas after the gas and the liquid material have been drawn into the reservoir 31 respectively. Also, the microcontroller 30 may control the first distance to adjust the volume of the liquid material drawn into the reservoir 31 and the second distance to adjust the volume of the gas drawn into the reservoir 31 respectively. After the gas has been drawn into the reservoir 31, a distance between the bottom of the printing platform 33 and a bottom of the liquid material in the reservoir 31 is equal to a thickness of a cured layer to be created. This facilitates subsequent printing steps of the 3D printer 3.

As shown in FIG. 3, the 3D printer 3 further comprises a memory unit 38 electrically connected to the microcontroller 30. The memory unit 38 stores a plurality of records of slicing information 381 of a 3D object to be created. After both the liquid material and the gas have been drawn into the reservoir 31, the microcontroller 30 may activate the illumination unit 34 to emit light toward the bottom of the printing platform 33 based on the records of slicing information 381, and activate the printing platform 33 to move along Z-axis a distance equal to the thickness of a cured layer. In such a manner, a slicing object of a plurality of cured layers of a 3D object can be continuously cured.

One technical effect of the invention is detailed below. The liquid material and the bottom of the reservoir 31 are separated by the gas. That is, a location of the slicing object to be cured is not attached to the bottom of the reservoir 31. After the slicing object has been cured, the microcontroller 30 does not perform additional layer separation steps, i.e., without separating a cured slicing object from the bottom of the reservoir 31. As a result, the purpose of continuous printing is achieved and in turn the printing speed is greatly increased.

As shown in FIG. 2, in the invention a port 310 is provided on the reservoir 31 which communicates with the liquid material tank 51 and the gas tank 61 respectively. In FIG. 2 the port 310 is provided on the bottom of the reservoir 31, but not limited thereto. When the microcontroller 30 instructs both the plunger 32 and the printing platform 33 to lift, the liquid material or the gas may flow into the reservoir 31 via the port 310 as controlled.

As shown in FIG. 2, the 3D printer 3 of the invention further comprises a first valve 35, a second valve 36 and a conduit 37 which is a Y-shaped conduit in the invention in a non-limiting manner. As shown in FIG. 3, the microcontroller 30 is electrically connected to the first valve 35 and the second valve 36 respectively.

Specifically, the liquid material tank 51 communicates with a first end of the conduit 37 via the first valve 35, the gas tank 61 communicates with a second end of the conduit 37 via the second valve 36, and a third end of the conduit 37 is at the port 310. For drawing the liquid material into the reservoir 31, the microcontroller 30 may open the first valve 35 and close the second valve 36, and lift both the plunger 32 and the printing platform 33. After both the plunger 32 and the printing platform 33 have lifted, the liquid material in the liquid material tank 51 is drawn into the reservoir 31 due to pressure of the formed sealed space 4 between both the plunger 32 and the printing platform 33 and the bottom of the reservoir 31. Also, the gas in the gas tank 61 is prevented from entering the reservoir 31 due to closure of the second valve 36.

Likewise, for drawing the gas into the reservoir 31, the microcontroller 30 may close the first valve 35 and open the second valve 36, and lift the plunger 32. After the plunger 32 has lifted, the gas in the gas tank 61 is drawn into the reservoir 31 due to pressure of the formed sealed space 4 between both the plunger 32 and the bottom of the reservoir 31. Also, the liquid material in the liquid material tank 51 is prevented from entering the reservoir 31 due to closure of the first valve 35.

Figure 4:
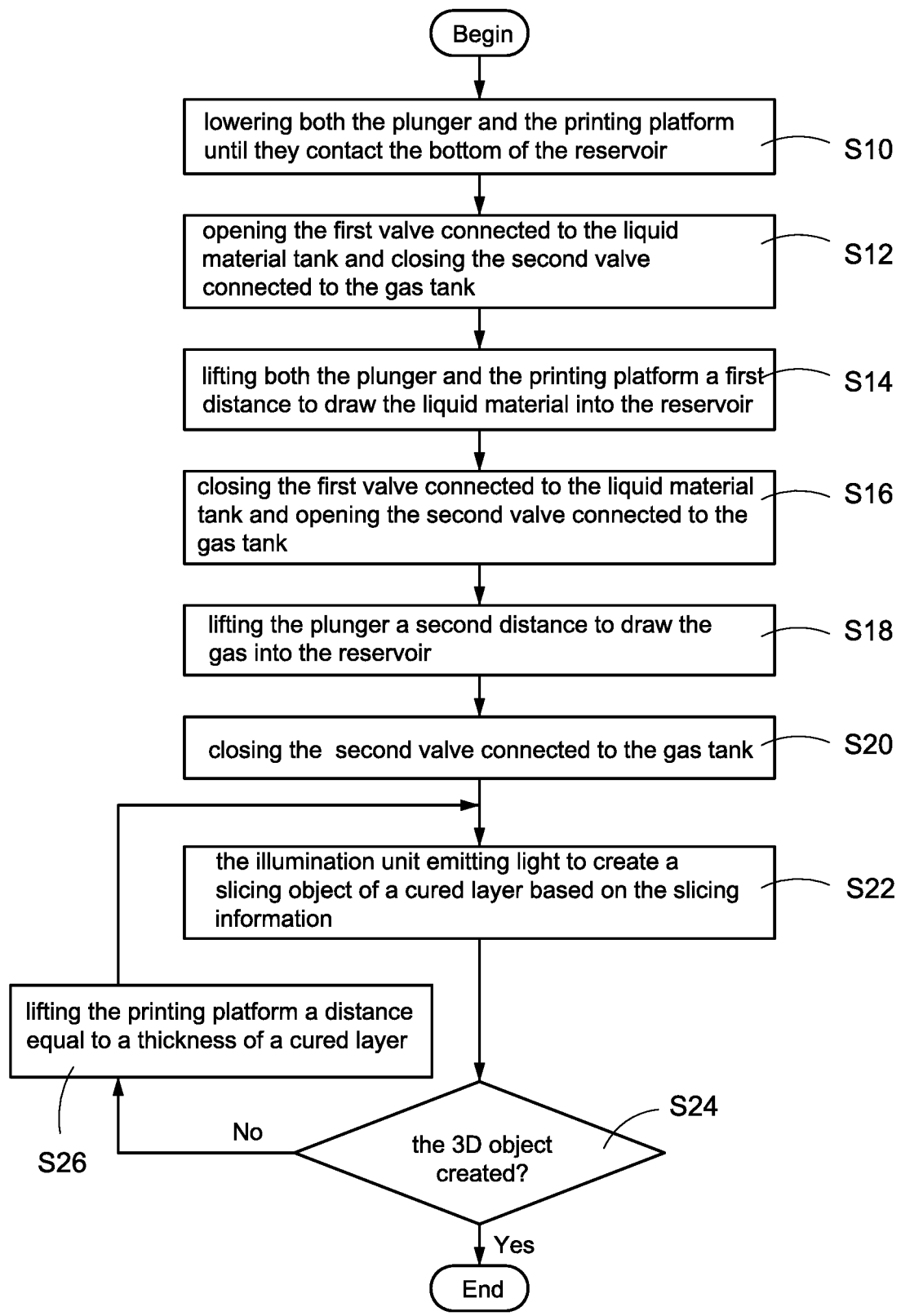
FIG. 4 is a flowchart illustrating a printing method according to a first preferred embodiment of the invention, the printing method using the 3D printer of FIG. 2.

Referring to FIG. 4 in conjunction with FIGS. 2 and 3 in which FIG. 4 is a flowchart illustrating a printing method according to a first preferred embodiment of the invention, the printing method using the 3D printer 3 of FIG. 2 or FIG. 3. Specifically, the printing method uses the SLA 3D printer 3 having the microcontroller 30, the reservoir 31, the plunger 32, the printing platform 33 flush with the plunger 32, the illumination unit 34 under the reservoir 31, the liquid material tank 51 for storing liquid material, and the gas tank 61 for storing gas.

As illustrated in FIG. 4, prior to printing by using the 3D printer 3, the microcontroller 30 activates both the plunger 32 and the printing platform 33 to move downward until they contact the bottom of the reservoir 31 (step S10). Also, the sealed space 4 does not exist inside the reservoir 31. Specifically, the microcontroller 30 may open a valve on the reservoir 31 to communicate with the atmosphere so that both the plunger 32 and the printing platform 33 may smoothly move to the bottom of the reservoir 31.

Next, the microcontroller 30 may lift both the plunger 32 and the printing platform 33 to draw the liquid material into the reservoir 31. In detail, the microcontroller 30 may open the first valve 35 connected to the liquid material tank 51 and close the second valve 36 connected to the gas tank 61 (step S12). Next, the microcontroller 30 lifts both the plunger 32 and the printing platform 33 from the bottom of the reservoir 31 a first distance along Z-axis. The liquid material in the liquid material tank 51 is drawn into the reservoir 31 via the port 310 (step S14).

Next, the microcontroller 30 may lift the plunger 32 to draw the gas into the reservoir 31. In detail, the microcontroller 30 may close the first valve 35 connected to the liquid material tank 51 and open the second valve 36 connected to the gas tank 61 (step S16). Next, the microcontroller 30 further lifts the plunger 32 a second distance along Z-axis. The gas in the gas tank 61 is drawn into the reservoir 31 via the port 310 (step S18). The gas concentrates on a lower portion of the reservoir 31 and the liquid material is floated on the top of the gas. A distance between the bottom of the printing platform 33 and a bottom of the liquid material in the reservoir 31 is equal to a thickness of a cured layer to be created. The thickness of a cured layer to be created is equal to a thickness of a slicing object of a 3D object to be created by the 3D printer 3. The thickness of a slicing object is known in the art of 3D printing and thus a detailed description thereof is omitted herein for the sake of brevity.

Subsequent to step S18, after the gas for printing has been drawn into the reservoir 31, the microcontroller 30 closes the second valve 36 connected to the gas tank 61 (step S20).

Next, the microcontroller 30 obtains the slicing information of one of the cured layers (e.g., the first layer) of the 3D object to be created. Next, the microcontroller 30 instructs the illumination unit 34 to emit light toward the bottom of the printing platform 33 to create a slicing object of one of a plurality of cured layers (e.g., a first layer) of the 3D object based on the slicing information (step S22). Next, the microcontroller 30 determines whether the 3D object has been created (step S24), i.e., determining whether the plurality of records of slicing information 381 of the 3D object have been used for creating a corresponding slicing object.

If the microcontroller 30 determines that the 3D object has been created, the printing method of the invention ends. Otherwise (i.e., if the microcontroller 30 determines that the 3D object has not been created), the microcontroller 30 instructs the printing platform 33 to lift a distance equal to a thickness of a cured layer along Z-axis (step S26). Thus, the printing platform 33 is located at an elevation for creating a next cured layer (e.g., a second layer). Next, the microcontroller 30 loops back to step S22. In step S22, as described above, the microcontroller 30 obtains the slicing information of one of the cured layers (e.g., the second layer) of the 3D object. Next, the microcontroller 30 instructs the illumination unit 34 to emit light toward the bottom of the printing platform 33 to create a slicing object of a next cured layer based on the slicing information.

Referring to FIGS. 5A to 5E, they show first, second, third, fourth and fifth printing processes performed by the 3D printer corresponding to the printing method of the invention respectively.

Figure 5A:
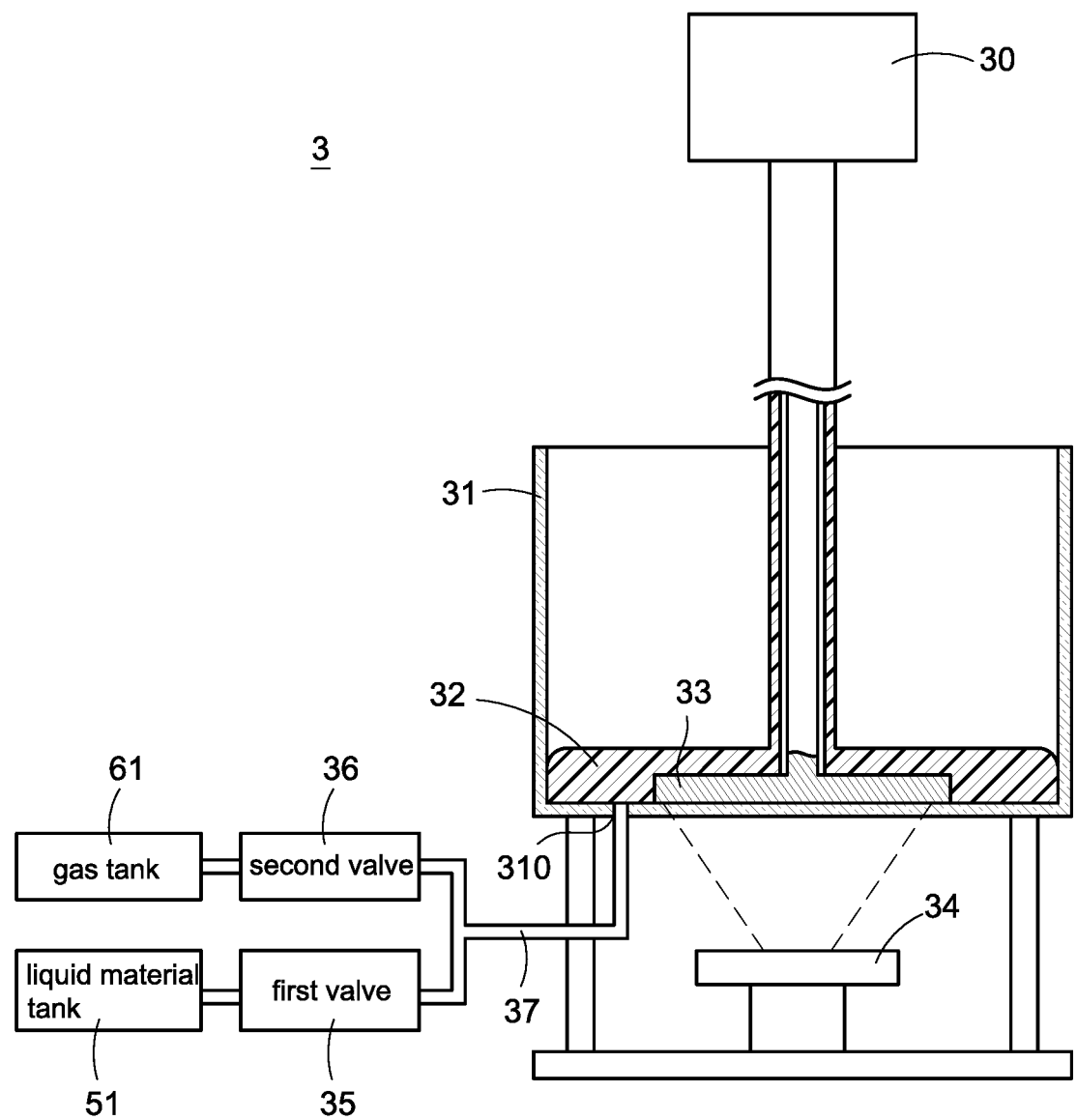
FIG. 5A is a view similar to FIG. 2 showing a first printing process performed by the 3D printer corresponding to the printing method.

As shown in FIG. 5A, prior to printing, the microcontroller 30 activates and moves both the plunger 32 and the printing platform 33 downward until being stopped by the bottom of the reservoir 31. At this position, flat undersides of both the plunger 32 and the printing platform 33 are at the same elevation and contact the bottom of the reservoir 31. As shown in FIG. 5A, both the liquid material tank 51 and the gas tank 61 do not communicate with the reservoir 31.

Figure 5B:
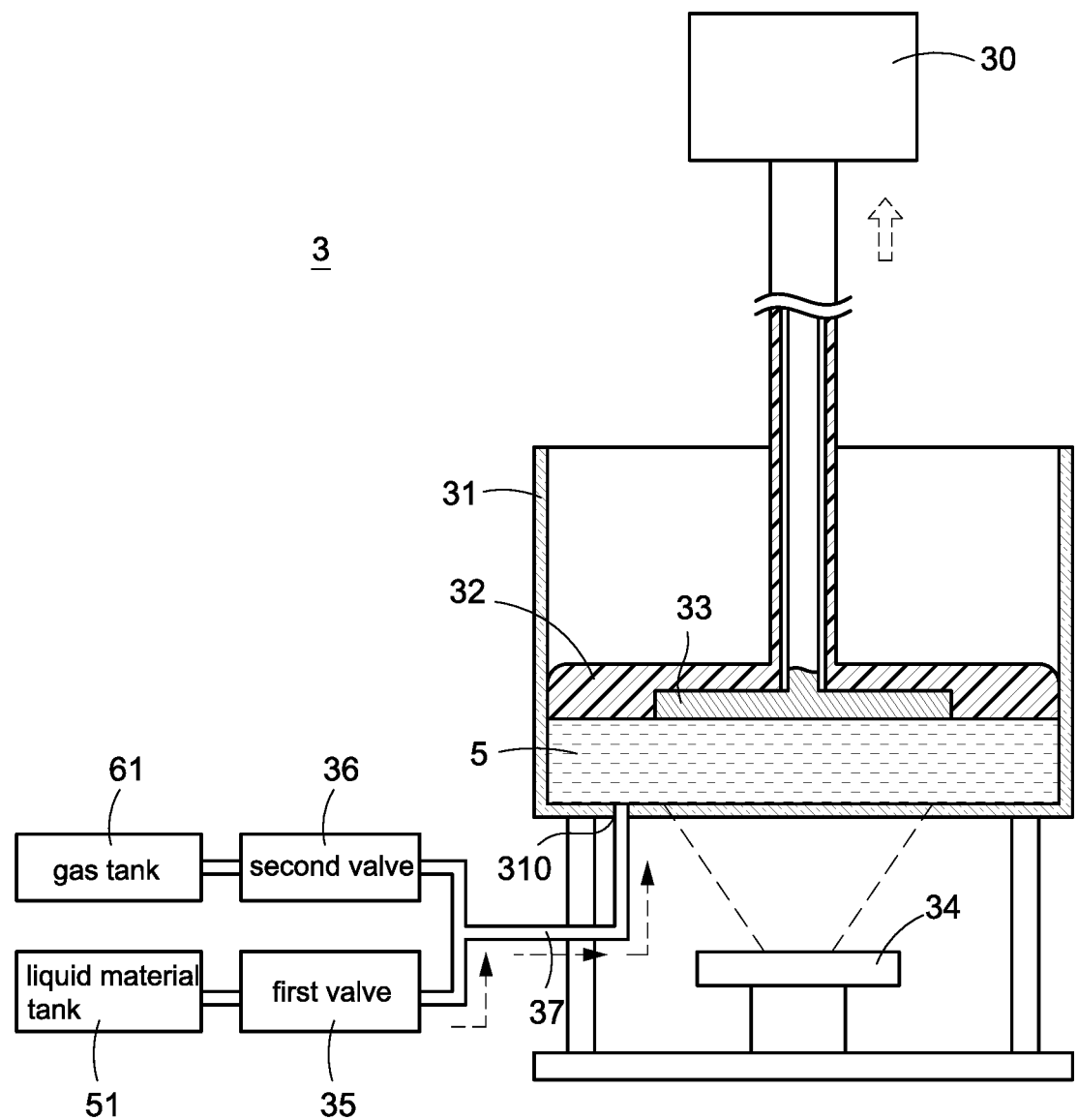
FIG. 5B is a view similar to FIG. 2 showing a second printing process performed by the 3D printer corresponding to the printing method.
Figure 5C:
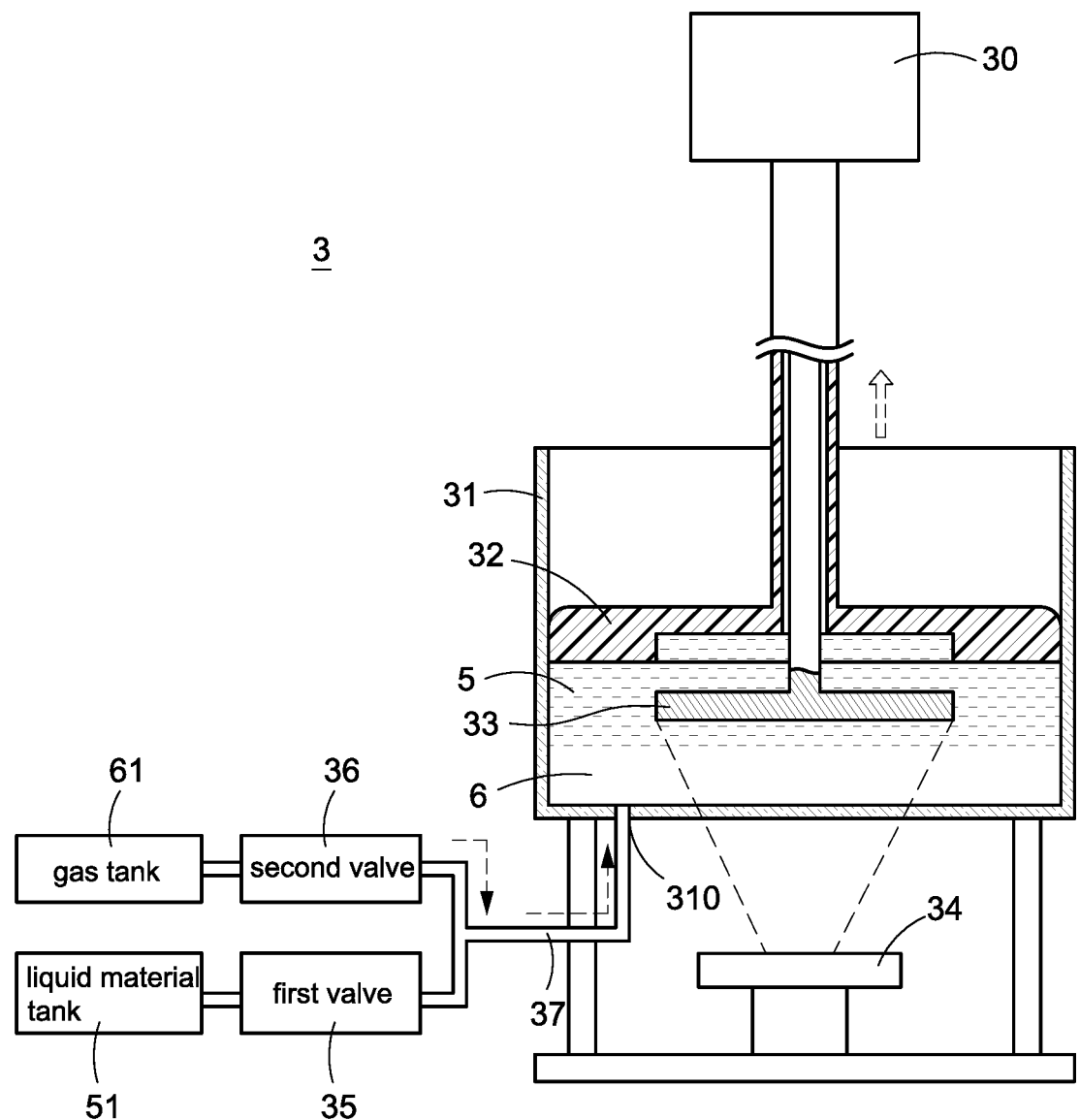
FIG. 5C is a view similar to FIG. 2 showing a third printing process performed by the 3D printer corresponding to the printing method.

As shown in FIG. 5B, the microcontroller 30 opens the first valve 35 connected to the liquid material tank 51 and closes the second valve 36 connected to the gas tank 61 so that the liquid material tank 51 may communicate with the reservoir 31 via the conduit 37 and the port 310 with the gas tank 61 disconnected from the reservoir 31. Next, the microcontroller 30 lifts both the plunger 32 and the printing platform 33 to draw the liquid material 5 in the liquid material tank 51 into the reservoir 31. As shown in FIG. 5C, the microcontroller 30 closes the first valve 35 connected to the liquid material tank 51 and opens the second valve 36 connected to the gas tank 61 so that the gas tank 61 may communicate with the reservoir 31 via the conduit 37 and the port 310 with the liquid material tank 51 disconnected from the reservoir 31. Next, the microcontroller 30 lifts the plunger 32 to separate it from the printing platform 33 so that the gas 6 in the gas tank 61 can be drawn into the reservoir 31.

As described above, specific liquid material and gas are chosen in implementing the 3D printer 3 and the printing method using the same according to the invention. Specifically, specific gravity of the gas is greater than that of the liquid material. As shown in FIG. 5C, the drawn gas 6 concentrates on a lower portion of the reservoir 31 with the liquid material 5 floated thereon. As a result, the liquid material 5 is separated from the bottom of the reservoir 31.

Figure 5D:
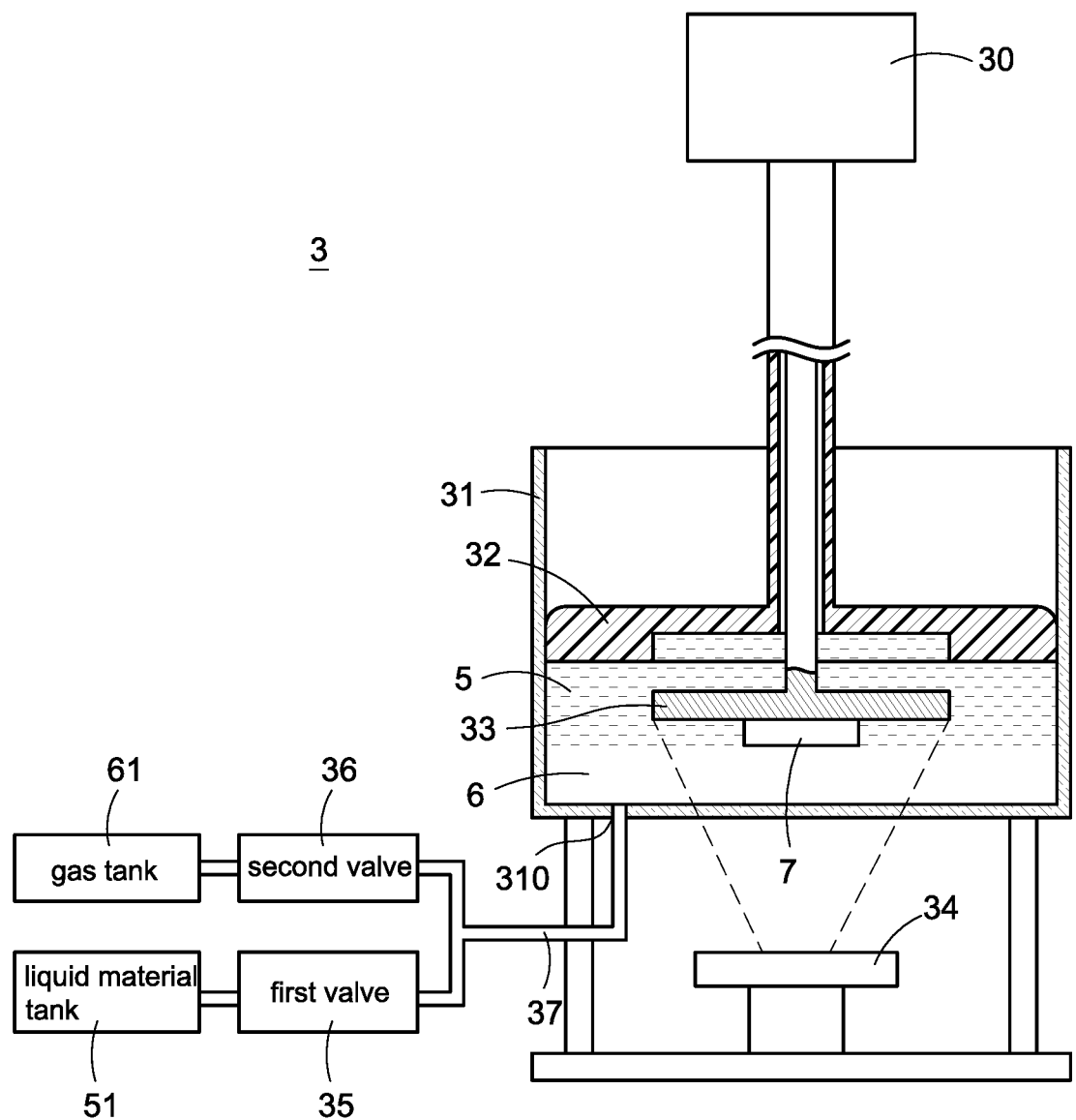
FIG. 5D is a view similar to FIG. 2 showing a fourth printing process performed by the 3D printer corresponding to the printing method.

Next, as shown in FIG. 5D, the microcontroller 30 may close both the first and second valves 35, 36 to disconnect both the first and second valves 35, 36 from the reservoir 31. Next, a printing process is performed.

Specifically, the microcontroller 30 may activate the illumination unit 34 to emit light toward the bottom of the printing platform 33 based on the obtained record of slicing information 381 so that portions of the liquid material 5 can be cured and a corresponding slicing object 7 can be created. As shown in FIG. 5D, the liquid material 5 is separated from the bottom of the reservoir 31 and the created slicing object 7 is disposed above the bottom of the reservoir 31. Thus, the microcontroller 30 does not perform additional layer separation steps. As a result, the purpose of continuous printing is achieved by the 3D printer 3 of the invention and in turn the printing speed is greatly increased.

Figure 5E:
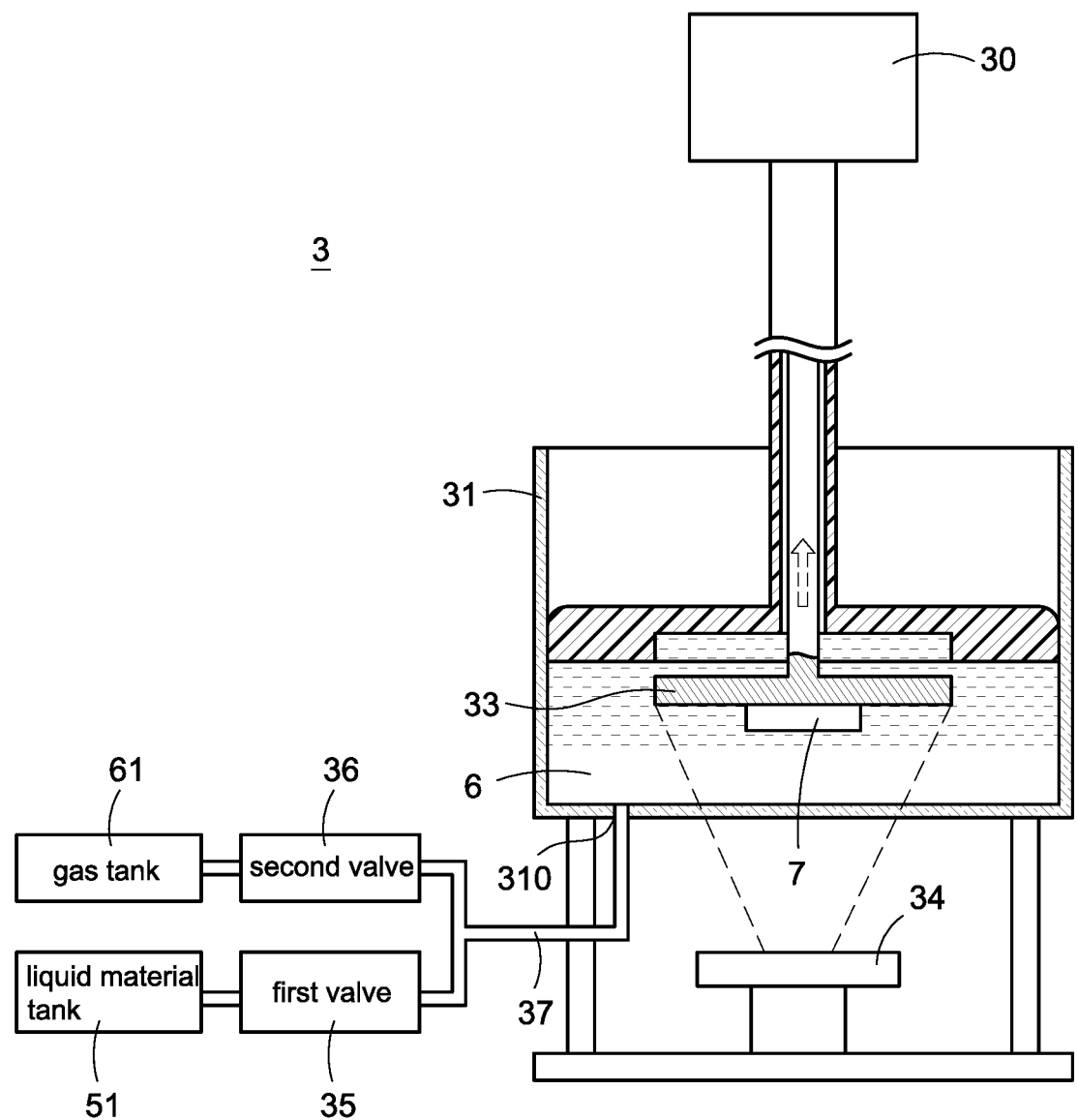
FIG. 5E is a view similar to FIG. 2 showing a fifth printing process performed by the 3D printer corresponding to the printing method.

Next, as shown in FIG. 5E, after the slicing object 7 of a cured layer has been cured, the microcontroller 30 lifts the printing platform 33 another distance equal to a printing thickness of a cured layer along Z-axis. Next, the microcontroller 30 activates the illumination unit 34 to emit light toward the bottom of the printing platform 33 based on the record of slicing information 381 of a next cured layer to be created. As a result, the slicing object 7 of the next cured layer is created. The 3D printer 3 can create a 3D object by adding the slicing objects 7 together by repeatedly performing steps performed in FIG. 5E.

As described above, the purpose of continuous printing is achieved by the 3D printer 3 and the printing method using the same of the invention because no additional layer separation steps are performed. As a result, the purposes of continuous printing and greatly increasing the printing speed are achieved by the 3D printer 3 of the invention and in turn the printing speed is greatly increased. Further, inside of the reservoir 31 of the 3D printer 3 is a sealed condition. Thus, the liquid material 5 and the gas 6 drawn into the reservoir 31 do not contact air. Preferably, material subject to oxidation can be chosen as the liquid material. Also, smell of the liquid material 5 in the reservoir 31 and smell of the gas 6 in the reservoir 31 do not propagate in the air. Thus, users do not need to bear both the smell of the liquid material 5 and the smell of the gas 6.

Figure 6:
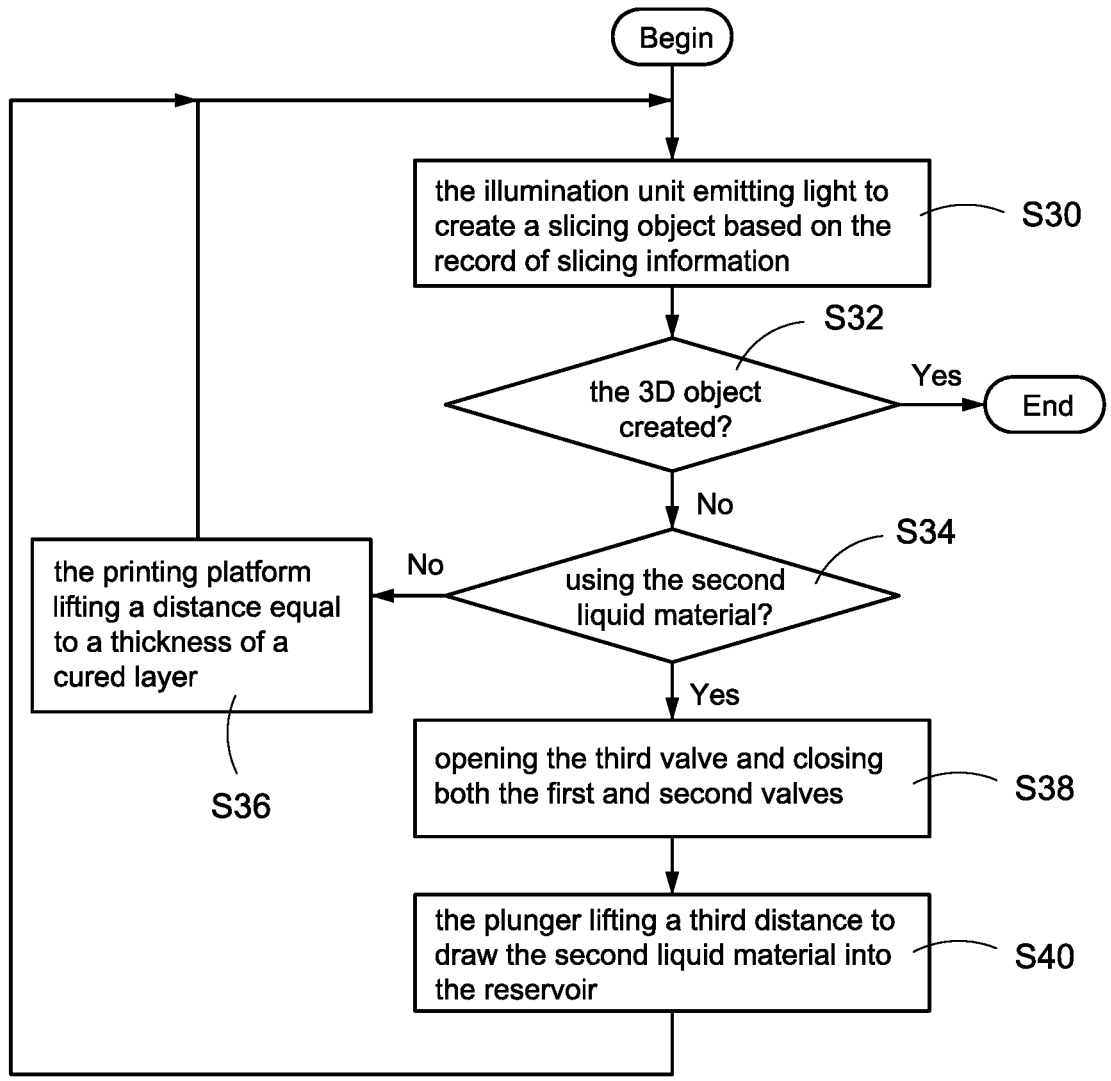
FIG. 6 is a flowchart illustrating a printing method according to a second preferred embodiment of the invention.
Figure 7:
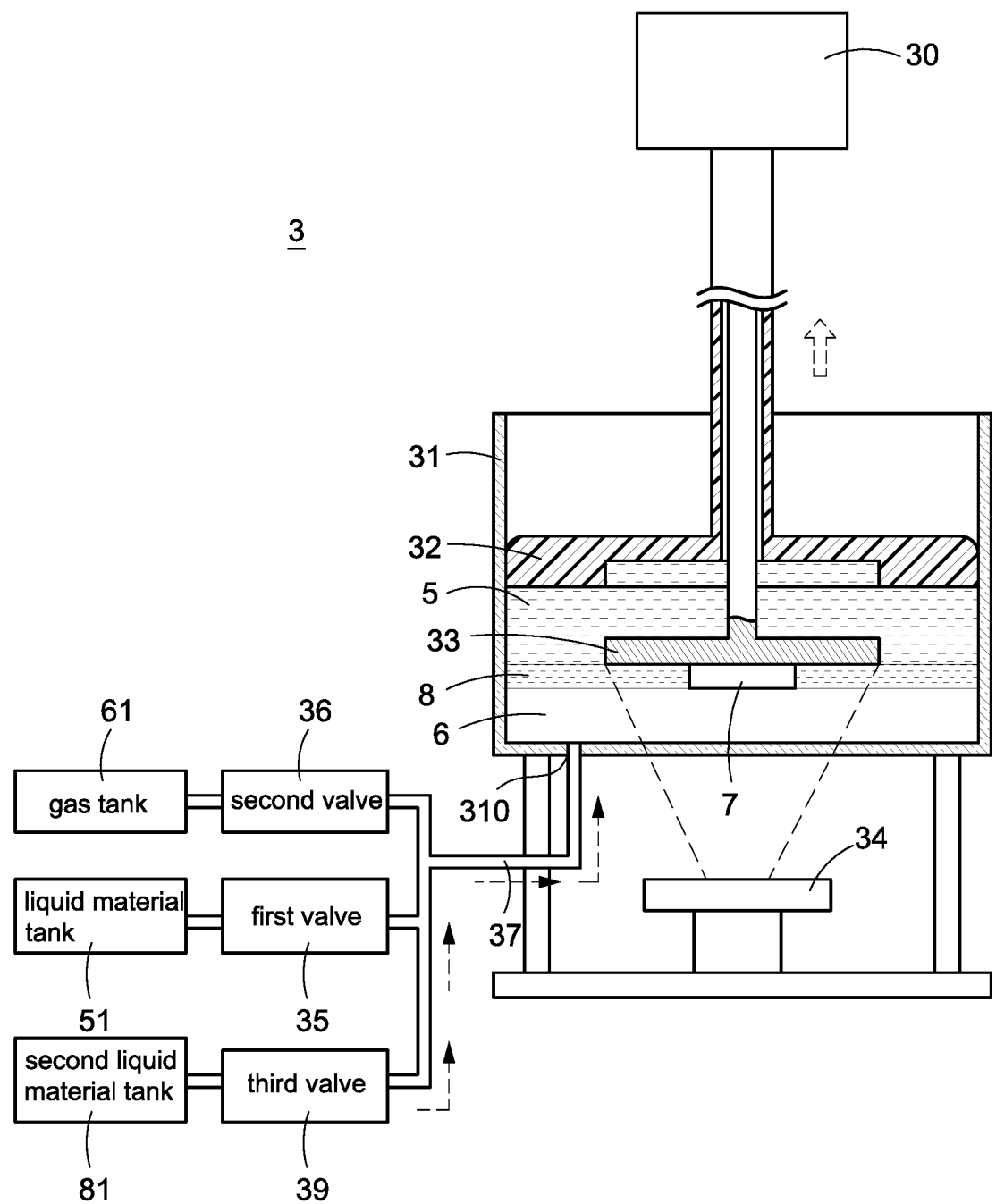
FIG. 7 is a side elevation in part section of a 3D printer according to a second preferred embodiment of the invention.

Referring to FIG. 6, it is a flowchart illustrating a printing method according to a second preferred embodiment of the invention, and referring to FIG. 7, it is a side elevation in part section of the 3D printer 3 according to a second preferred embodiment of the invention.

As shown in FIG. 7, the 3D printer 3 of the invention further comprises a third valve 39 and a second liquid material tank 81 for storing second liquid material 8. The second liquid material tank 81 is connected to a fourth end of the conduit 37 via the third valve 39. And in turn, the fourth end of the conduit 37 communicates with the reservoir 31 via the port 310. After determining that the second liquid material 8 is needed in the printing process, the microcontroller 30 opens the third valve 39 and closes both the first and second valves 35, 36. Next, the microprocessor 30 activates the plunger 32 to lift so that the second liquid material 8 in the second liquid material tank 81 may be drawn into the reservoir 31.

In an embodiment, the specific gravity of the second liquid material 8 is less than that of the gas 6 but greater than that of the liquid material 5. As show in FIG. 7, after the second liquid material 8 has been drawn into the reservoir 31, the second liquid material 8 is located between the liquid material 5 and the gas 6. The microprocessor 30 controls location of the printing platform 33 in the printing process so that a distance between the bottom of the printing platform 33 and the top of the gas 6 is equal to a thickness of a cured layer to be created. The second liquid material 8 is located below the liquid material 5. Thus, light emitted by the illumination unit 34 is directed to the second liquid material 8. Portions of the lit second liquid material 8 are cured to form a corresponding slicing object 7.

By utilizing above technical solution, the 3D printer 3 of the invention may create slicing objects 7 of different materials by illuminating the liquid material 5 or the second liquid material 8. As a result, the created 3D objects may have different properties, characteristics and/or colors.

As illustrated in FIG. 6, after both the liquid material 5 and the gas 6 have drawn into the reservoir 3, similar to step S22 of FIG. 4, the microprocessor 30 instructs the illumination unit 34 to emit light toward the bottom of the printing platform 33 to create a corresponding slicing object based on the record of slicing information 381 (step S30). Next, the microprocessor 30 determines whether the 3D object has been created (step S32). If yes, the flowchart ends successfully.

If not (i.e., the microprocessor 30 determining that the 3D object has not been created), the microprocessor 30 obtains a next record of slicing information 381 and further determines whether it is necessary to use the second liquid material 8 based on the next record of slicing information 381 (step S34). That is, the microprocessor 30 determines whether the record of slicing information 381 stores 3D objects having different properties, characteristics and/or colors. If not, the flowchart goes to step S36. Similar to step S26 of FIG. 4, the microprocessor 30 activates the printing platform 33 to lift a distance equal to a thickness of a cured layer along Z-axis (step S36). The flowchart further loops back to step S30 to create a slicing object 7 of a next cured layer to be created.

If the determination in step S34 is yes, the flowchart goes to step S38. In step S38, the microprocessor 30 opens the third valve 39 and closes both the first and second valves 35, 36. Next in step S40, the microprocessor 30 activates the plunger 32 to lift a third distance along Z-axis so that the second liquid material 8 in the second liquid material tank 81 may be drawn into the reservoir 31. The flowchart loops back to step S30.

As described above, the specific gravity of the second liquid material 8 is less than that of the gas 6 but greater than that of the liquid material 5. After the second liquid material 8 has been drawn into the reservoir 31, the second liquid material 8 is located between the liquid material 5 and the gas 6. The microprocessor 30 may adjust the third distance by controlling the volume of the second liquid material 8 drawn into the reservoir 31 so that a distance between the bottom of the printing platform 33 and the bottom of the second liquid material 8 is equal to a thickness of a cured layer to be created. After step S40, the flowchart loops back to step S30. In step S30, the microprocessor 30 instructs the illumination unit 34 to emit light toward the bottom of the printing platform 33 to create a slicing object 7 of a cured layer to be created.

Above technical solution enables the 3D printer 3 to employ different types of liquid material for curing. Thus, the created 3D objects may have different properties, characteristics and/or colors. As a result, performance of the 3D printer 3 can be increased greatly.

Figure 8A:
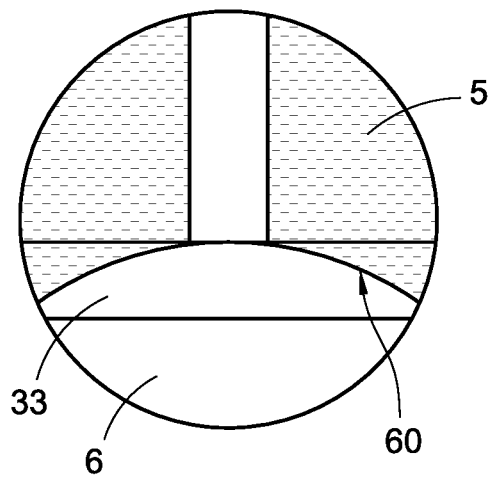
FIG. 8A is a first enlarged view showing contact of the liquid material and the gas.
Figure 8B:
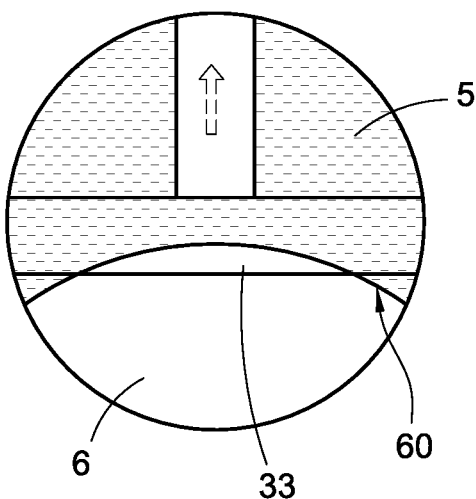
FIG. 8B is a second enlarged view showing contact of the liquid material and the gas.
Figure 8C:
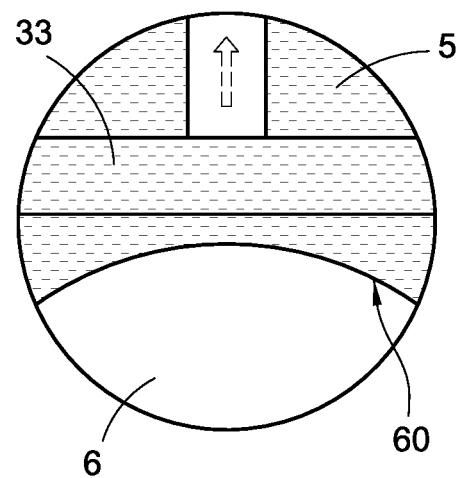
FIG. 8C is a third enlarged view showing contact of the liquid material and the gas.

Referring to FIG. 8A, it is a first enlarged view showing contact of the liquid material and the gas; referring to FIG. 8B, it is a second enlarged view showing contact of the liquid material and the gas; and referring to FIG. 8C, it is a third enlarged view showing contact of the liquid material and the gas respectively.

The gas 6 drawn into the reservoir 31 has surface tension which results in the formation of an arc surface 60 between the liquid material 5 and the gas 6. In other words, a bottom surface of the liquid material 5 may be not flat. As discussed above, in step S18 of FIG. 4, the microprocessor 30 may control the volume of the gas 6 drawn into the reservoir 31 so that a distance between the bottom of the printing platform 33 and the bottom of the liquid material 5 is equal to a thickness of a cured layer to be created. However, the existence of the arc surface 60 can compromise the creation of the slicing objects 7 of the cured layers of the 3D object.

In the embodiment, a plurality of records of improvement information 382 are stored in the memory unit 38 of the 3D printer 3 (see FIG. 3). In the printing process (e.g., steps S22 and S26 of FIG. 4), the microcontroller 30 may activate the illumination unit 34 to emit light toward the bottom of the printing platform 33 based on the records of improvement information 382 (specifically, based on the records of slicing information 381 in company with the records of improvement information 382). As a result, the arc surface 60 can be improved by using software.

In an embodiment, the microprocessor 30 can solve above problem by adjusting the number of the cured layers of a 3D object. As shown in FIG. 8A, when the printing platform 33 is located at an elevation flush with top of a thickness of a first cured layer of a 3D object, the microprocessor 30 does not activate the illumination unit 34 because the thickness of the first cured layer is adversely affected by the arc surface 60. Next as shown in FIG. 8B, the microprocessor 30 activates the printing platform 33 to lift to an elevation flush with top of a thickness of a second cured layer of the 3D object. The microprocessor 30 does not activate the illumination unit 34 because the thickness of the second cured layer is still adversely affected by the arc surface 60.

Next, as shown in FIG. 8C, the microprocessor 30 activates the printing platform 33 to lift to an elevation flush with top of a thickness of a third cured layer of the 3D object. At this position, the printing platform 33 clears the arc surface 60. Thus, the microprocessor 30 activates the illumination unit 34 to emit light based on the record of slicing information 381 of the first cured layer of the 3D object. As a result, a slicing object 7 of the first cured layer is created.

In another embodiment, the microprocessor 30 may improve the arc surface 60 by activating a sensor. For example, when the sensor senses that the printing platform 33 still contacts the gas 6, the microprocessor 30 activates the printing platform 33 to lift to an elevation flush with top of a thickness of a next cured layer. Further, when the sensor senses that the printing platform 33 clears the gas 6, a slicing object 7 of the first cured layer of the 3D object begins to create.

In another embodiment, when the printing platform 33 still contacts the arc surface 60, the microprocessor 30 may activate the illumination unit 34 to emit light to create a disposable support based on additional information (not shown). Also, after the printing platform 33 has lifted to clear the arc surface 60, the microprocessor 30 may activate the illumination unit 34 to emit light based on the record of slicing information 381 of the first cured layer of the 3D object in order to create a slicing object 7 of the first cured layer.

While above description is directed to the embodiments of the invention, the invention is not limited to such.

In any of above embodiments, the 3D printer 3 is a light curing 3D printer having the reservoir 31 of U-shaped longitudinal section and an open top, and the illumination unit 34 is disposed under the reservoir 31. It is understood that in other embodiments of the invention the 3D printer 3 may be a light curing 3D printer having the reservoir 31 of inverted U-shaped longitudinal section and an open bottom, and the illumination unit 34 is disposed above the reservoir 31.

Figure 9:
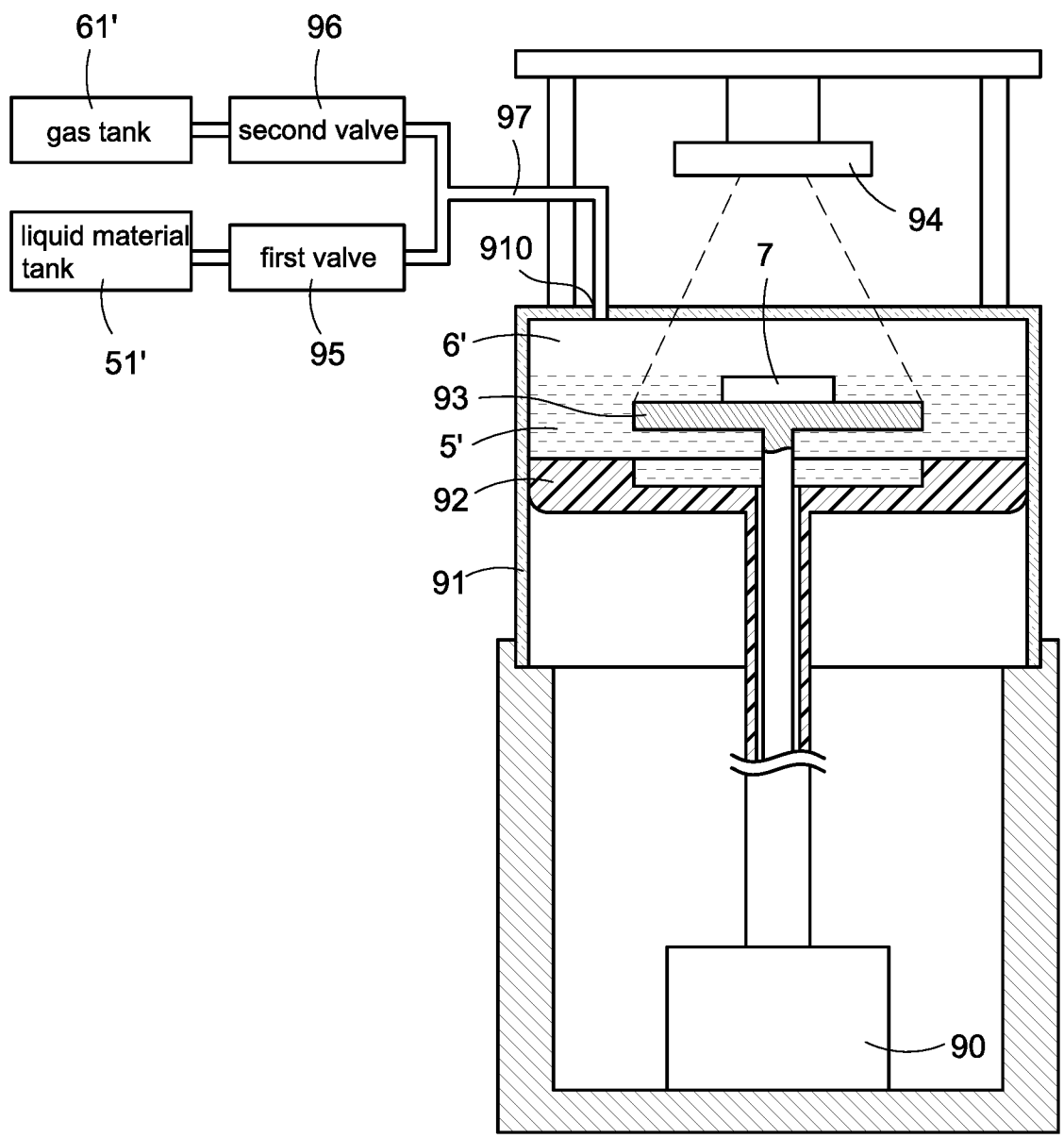
FIG. 9 is a side elevation in part section of a 3D printer according to a third preferred embodiment of the invention.

Referring to FIG. 9, it is a side elevation in part section of a 3D printer according to a third preferred embodiment of the invention. In FIG. 9, the 3D printer is a sealed type light curing 3D printer (called 3D printer 9 hereinafter). The 3D printer 9 comprises a microprocessor 90, a reservoir 91, a plunger 92, a printing platform 93, an illumination unit 94, a first valve 95, a second valve 96, a conduit 97, a port 910, a liquid material tank 51', and a gas tank 61' and these components are similar to or the same as that of the 3D printer 3 shown in FIG. 2 and FIG. 3. The 3D printer 9 is only different from the 3D printer 3 by having the reservoir 91 with an inverted U-shaped longitudinal section and an open bottom, and the illumination unit 94 disposed above the reservoir 91.

Specifically, the bottom of the reservoir 91 is open, the plunger 92 is disposed in the reservoir 91 facing the open bottom, and a sealed space is created in the reservoir 91. Also, the printing platform 93 is disposed on the plunger 92, and the top of the printing platform 93 is flush with that of the plunger 92.

Prior to printing, the microprocessor 90 moves both the plunger 92 and the printing platform 93 to contact the top of the reservoir 91 so that there is no space between both the plunger 92 and the printing platform 93 and the top of the reservoir 91. Next, the microprocessor 90 lowers both the plunger 92 and the printing platform 93 a first distance along Z-axis. Thus, a sealed space is created between both the plunger 92 and the printing platform 93 and the top of the reservoir 91. The pressure of creating the sealed space can draw the liquid material 5' of the liquid material tank 51 into the upper portion of the reservoir 91. Next, the microprocessor 90 lowers the plunger 92 a second distance along Z-axis so that the gas 6' in the gas tank 61' can be drawn into the upper portion of the reservoir 91.

It is noted that the user has to select specific types of the liquid material 5' and the gas 6' in the third embodiment. Specific gravity of the liquid material 5' is greater than that of the gas 6'. Thus, they are different from that described in the embodiment of FIGS. 2 to 4. After the liquid material 5' and the gas 61 have been drawn into the reservoir 91 by the microprocessor 90, the gas 6' concentrates on the upper portion of the reservoir 91 and the liquid material 5' is deposited below the gas 6'.

Likewise, the microprocessor 90 can control the volume of the sucked gas 6' so that a distance between the top of the printing platform 93 and that of the liquid material 5' is equal to a thickness of a cured layer to be created.

In the embodiment, the arrangement of the first valve 95, the second valve 96, the conduit 97, the port 910, the liquid material tank 51', and the gas tank 61' as well as the control of the first and second valves 95, 96 by the microprocessor 90 are similar to or the same as the reservoir 31, the first valve 35, the second valve 36, the conduit 37, the port 310, the liquid material tank 51 and the gas tank 61 discussed in the embodiment of FIGS. 2 to 4. But a detailed description thereof is omitted herein for the sake of brevity. In another embodiment, the 3D printer 9 may have the memory unit 38, the records of slicing information 381 and the records of improvement information 382 shown in FIG. 3; and the third valve 39 and the second liquid material tank 81 shown in FIG. 7. But a detailed description thereof is omitted herein for the sake of brevity.

After both the liquid material 5' and the gas 6' have been drawn into the reservoir 91, the microprocessor 90 activates the illumination unit 94 to emit light toward top of the printing platform 93 based on the records of slicing information of a 3D object to be created, and lowers the printing platform 93 along Z-axis a distance equal to a thickness of a cured layer. In such a manner, a slicing object 7 of a plurality of cured layers of a 3D object can be created by continuously curing.

It is envisaged by the invention that a continuous printing can be achieved by utilizing the 3D printer 3 to draw the gas 6 into the reservoir 31 (or utilizing the 3D printer 9 to draw the gas 6' into the reservoir 91), thereby greatly increasing the printing speed. Also, a user may choose a type of liquid material subject to oxidation or having smell for use since the reservoir 31 of the 3D printer 3 (or the reservoir 91 of the 3D printer 9) is in a sealed condition.

While the invention has been described in terms of preferred embodiments, those skilled in the art will recognize that the invention can be practiced with modifications within the spirit and scope of the appended claims.

What is claimed is:

1. A sealed type light curing 3D printer, comprising:
   a reservoir;
   a microcontroller;
   a plunger electrically connected to the microcontroller and configured to create a sealed space between itself and a bottom of the reservoir by disposing in the reservoir;
   a printing platform electrically connected to the microcontroller and releasably disposed on a bottom of the plunger wherein a bottom of the printing platform is flush with the bottom of the plunger;
   an illumination unit electrically connected to the microcontroller and disposed under the reservoir;
   a liquid material tank for storing liquid material and configured to communicate with the reservoir; and
   a gas tank for storing gas and configured to communicate with the reservoir;
   wherein the microcontroller lifts both the plunger and the printing platform from the bottom of the reservoir a first distance along Z-axis, thereby drawing the liquid material into the reservoir;
   wherein the microcontroller further lifts the plunger a second distance along Z-axis, thereby drawing the gas into the reservoir;
   wherein the gas concentrates on a lower portion of the reservoir and the liquid material is floated on top of the gas;
   wherein a distance between the bottom of the printing platform and a bottom of the liquid material in the reservoir is equal to a thickness of a cured layer to be created; and
   wherein in a printing process, the microcontroller activates the illumination unit to emit light toward the bottom of the printing platform based on a plurality of records of slicing information of a 3D object to be created, and further lifts the printing platform a distance along Z-axis, the distance being equal to the thickness of the cured layer, thereby continuously curing a slicing object of a plurality of the cured layers of the 3D object.

2. The sealed type light curing 3D printer as claimed in claim 1, wherein specific gravity of the gas is greater than that of the liquid material.

3. The sealed type light curing 3D printer as claimed in claim 2, further comprising a port on the reservoir for communicating with the liquid material tank and the gas tank respectively, wherein either the liquid material or the gas is configured to flow into the reservoir via the port at one time.

4. The sealed type light curing 3D printer as claimed in claim 3, further comprising a first valve, a second valve, and a conduit; wherein the liquid material tank communicates with a first end of the conduit via the first valve, the gas tank communicates with a second end of the conduit via the second valve, and a third end of the conduit is at the port; wherein in an operation of drawing the liquid material into the reservoir, the microcontroller opens the first valve and closes the second valve; and wherein in an operation of drawing the gas into the reservoir, the microcontroller closes the first valve and opens the second valve.

5. The sealed type light curing 3D printer as claimed in claim 4, further comprising a third valve and a second liquid material tank for storing second liquid material; wherein the second liquid material tank is connected to a fourth end of the conduit via the third valve, and the fourth end of the conduit communicates with the reservoir via the port; wherein in an operation of drawing the second liquid material into the reservoir, the microcontroller opens the third valve and closes both the first and second valves; and wherein specific gravity of the second liquid material is less than that of the gas but greater than that of the liquid material.

6. The sealed type light curing 3D printer as claimed in claim 4, further comprising a memory unit electrically connected to the microcontroller; wherein the memory unit stores the records of slicing information and a plurality of records of improvement information; and wherein in a printing operation, the microcontroller activates both the illumination unit and the printing platform based on the records of improvement information, thereby improving an arc surface between the liquid material and the gas formed by surface tension of the gas in the reservoir.

7. A sealed type light curing 3D printer, comprising:
a reservoir;
a microcontroller;
a plunger electrically connected to the microcontroller and configured to create a sealed space between itself and a top of the reservoir by disposing in the reservoir;
a printing platform electrically connected to the microcontroller and releasably disposed on a top of the plunger wherein a top of the printing platform is flush with the top of the plunger;
an illumination unit electrically connected to the microcontroller and disposed above the reservoir;
a liquid material tank for storing liquid material and configured to communicate with the reservoir; and
a gas tank for storing gas and configured to communicate with the reservoir;
wherein the microcontroller lowers both the plunger and the printing platform from the top of the reservoir a first distance along Z-axis, thereby drawing the liquid material into the reservoir;
wherein the microcontroller further lowers the plunger a second distance along Z-axis, thereby drawing the gas into the reservoir;
wherein the gas concentrates on an upper portion of the reservoir and the liquid material is deposited below the gas;
wherein a distance between the top of the printing platform and a top of the liquid material in the reservoir is equal to a thickness of a cured layer to be created; and
wherein in a printing process, the microcontroller activates the illumination unit to emit light toward the top of the printing platform based on a plurality of records of slicing information of a 3D object to be created, and further lowers the printing platform a distance along Z-axis, the distance being equal to the thickness of the cured layer, thereby continuously curing a slicing object of a plurality of the cured layers of the 3D object.

8. The sealed type light curing 3D printer as claimed in claim 7, wherein specific gravity of the liquid material is greater than that of the gas.

9. The sealed type light curing 3D printer as claimed in claim 8, further comprising a port on the reservoir for communicating with the liquid material tank and the gas tank respectively, wherein either the liquid material or the gas is configured to flow into the reservoir via the port at one time.

10. The sealed type light curing 3D printer as claimed in claim 9, further comprising a first valve, a second valve, and a conduit; wherein the liquid material tank communicates with a first end of the conduit via the first valve, the gas tank communicates with a second end of the conduit via the second valve, and a third end of the conduit is at the port; wherein in an operation of drawing the liquid material into the reservoir, the microcontroller opens the first valve and closes the second valve; and wherein in an operation of drawing the gas into the reservoir, the microcontroller closes the first valve and opens the second valve.

11. The sealed type light curing 3D printer as claimed in claim 10, further comprising a third valve and a second liquid material tank for storing second liquid material; wherein the second liquid material tank is connected to a fourth end of the conduit via the third valve, and the fourth end of the conduit communicates with the reservoir via the port; wherein in an operation of drawing the second liquid material into the reservoir, the microcontroller opens the third valve and closes both the first and second valves; and wherein specific gravity of the second liquid material is less than that of the liquid material but greater than that of the gas.

12. The sealed type light curing 3D printer as claimed in claim 10, further comprising a memory unit electrically connected to the microcontroller; wherein the memory unit stores the records of slicing information and a plurality of records of improvement information; and wherein in a printing operation, the microcontroller activates both the illumination unit and the printing platform based on the records of improvement information, thereby improving an arc surface between the liquid material and the gas formed by surface tension of the gas in the reservoir.

* * * * *